(12) United States Patent
Copping et al.

(10) Patent No.: US 8,800,683 B2
(45) Date of Patent: *Aug. 12, 2014

(54) EASY OPEN LINERS FOR SOIL AND SEDIMENT SAMPLERS

(75) Inventors: Ceri E B Copping, Badingham (GB);
Lenny Coakley, Newmarket (GB);
Kevin Russell Porter, Longstaton (GB);
Todd Merrell, Oneida, NY (US)

(73) Assignee: ARCADIS Corporate Services, Inc., Highlands Ranch, CO (US)

( * ) Notice: Subject to any disclaimer, the term of this patent is extended or adjusted under 35 U.S.C. 154(b) by 481 days.

This patent is subject to a terminal disclaimer.

(21) Appl. No.: 13/161,863

(22) Filed: Jun. 16, 2011

(65) Prior Publication Data

US 2011/0277566 A1    Nov. 17, 2011

Related U.S. Application Data

(63) Continuation-in-part of application No. 12/959,925, filed on Dec. 3, 2010, now Pat. No. 8,459,374.

(30) Foreign Application Priority Data

May 12, 2010  (GB) .................................. 1007911.9
Feb. 4, 2011  (GB) .................................. 1101975.9

(51) Int. Cl.
*G01N 1/04*    (2006.01)

(52) U.S. Cl.
USPC ............................. 175/20; 175/58; 175/244

(58) Field of Classification Search
CPC ................................ E21B 25/00; E21B 25/06
USPC .............................................. 175/20, 58, 244
See application file for complete search history.

(56) References Cited

U.S. PATENT DOCUMENTS

| 5,606,139 A | 2/1997 | Wittig et al. |
| 8,459,374 B1 * | 6/2013 | Copping et al. ................ 175/20 |
| 2002/0194937 A1 | 12/2002 | Scott et al. |

FOREIGN PATENT DOCUMENTS

| GB | 2480290 A | 11/2011 |
| GB | 2480345 A | 11/2011 |
| JP | 9072184 A | 3/1997 |

* cited by examiner

*Primary Examiner* — William P Neuder
(74) *Attorney, Agent, or Firm* — Nancy J. Flint, Esq.; Nancy J. Flint, Attorney At Law, P.A.

(57) ABSTRACT

A system and method for an easy-to-open liner for use in connection with soil and sediment samplers, including direct push technology, rotary and coring systems, is disclosed. The liner is pre-scored along its length by one or more score lines formed in the exterior surface or the interior surface of the liner. After removal from the sampler, the liner can easily be opened to expose the contained sample without the need of cutting blades or other sharp objects, in accordance with health and safety requirements.

15 Claims, 15 Drawing Sheets

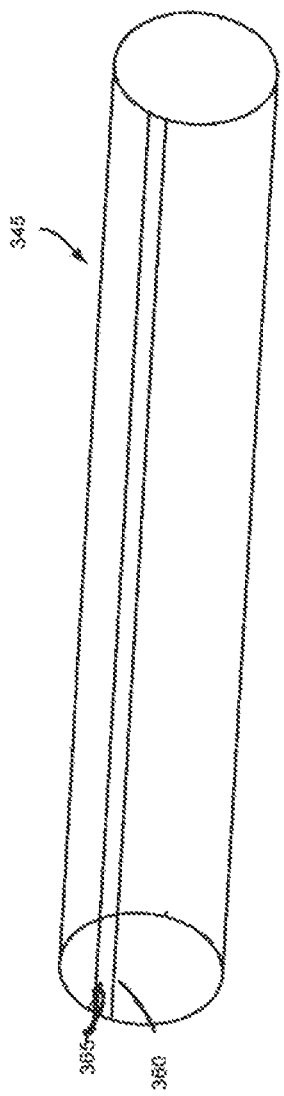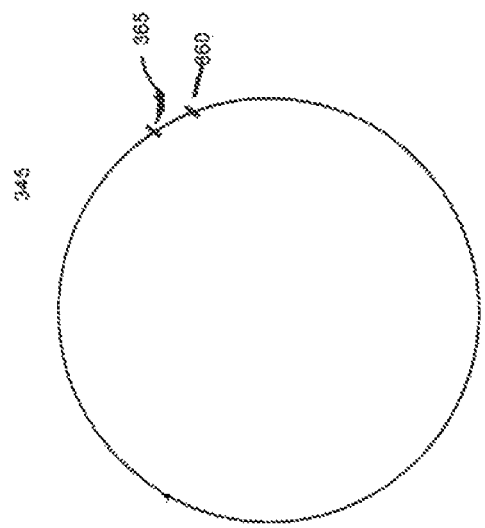
FIG. 3A
FIG. 3B

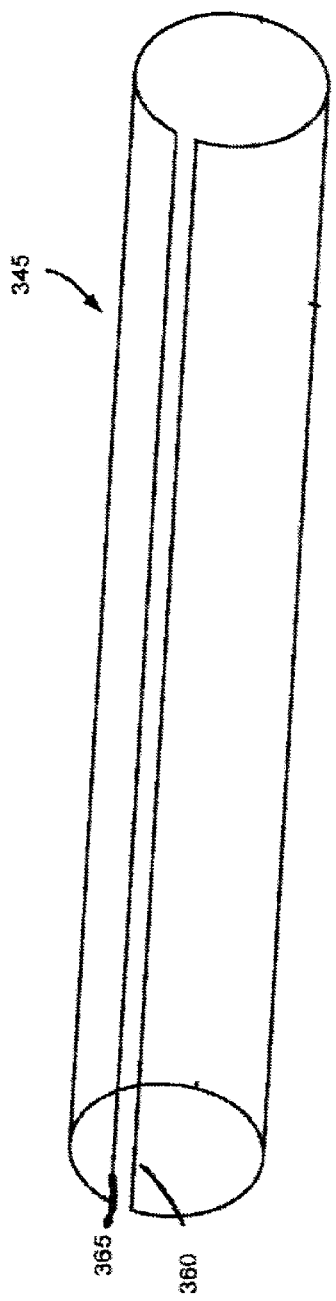

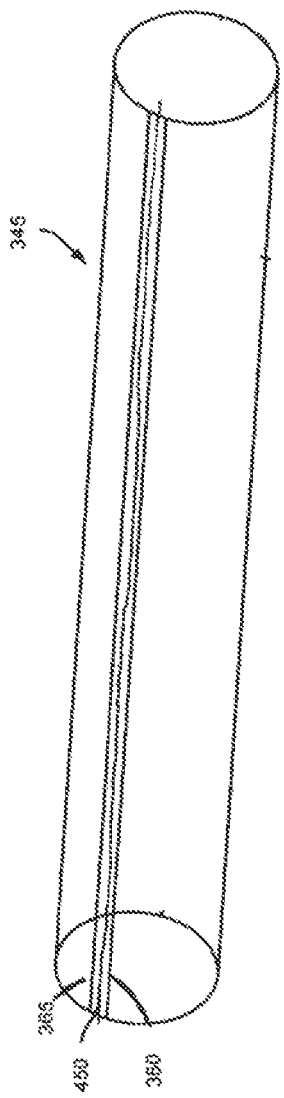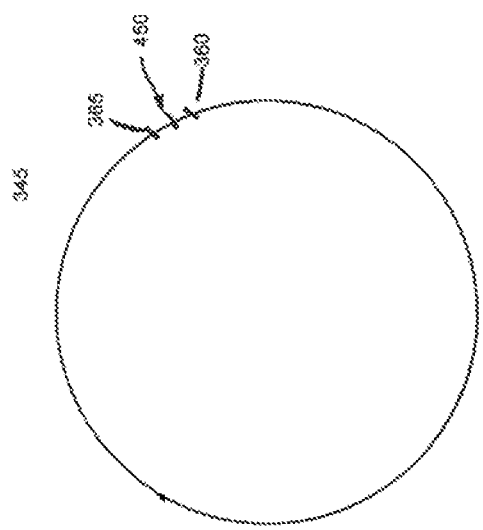
FIG. 4A
FIG. 4B

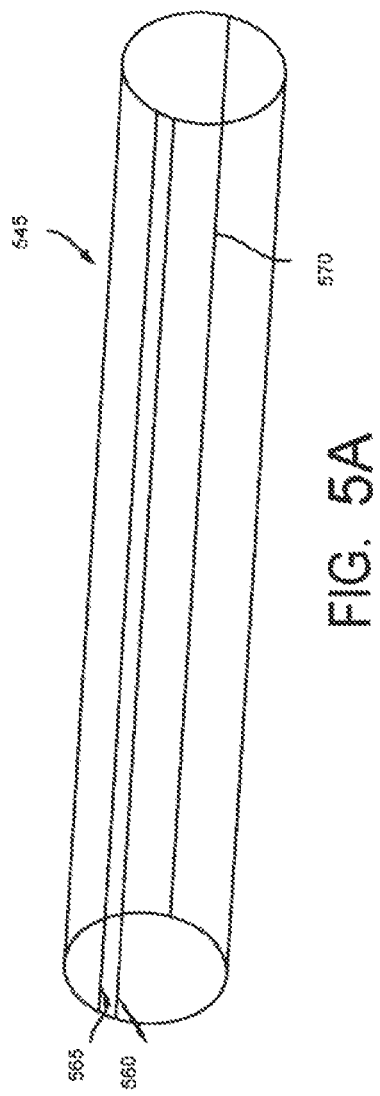
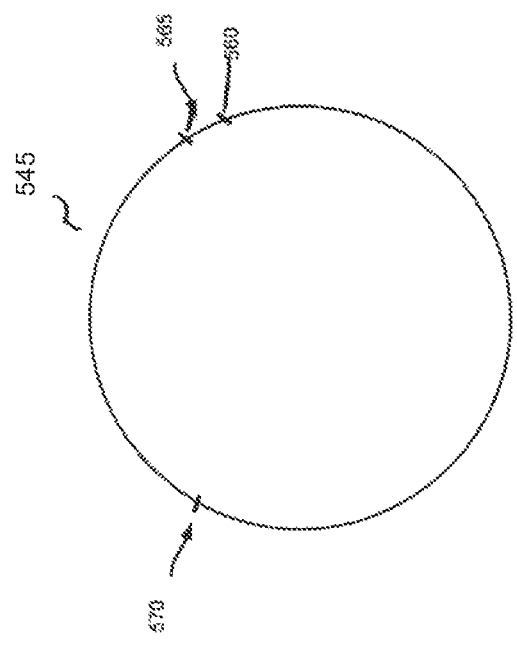

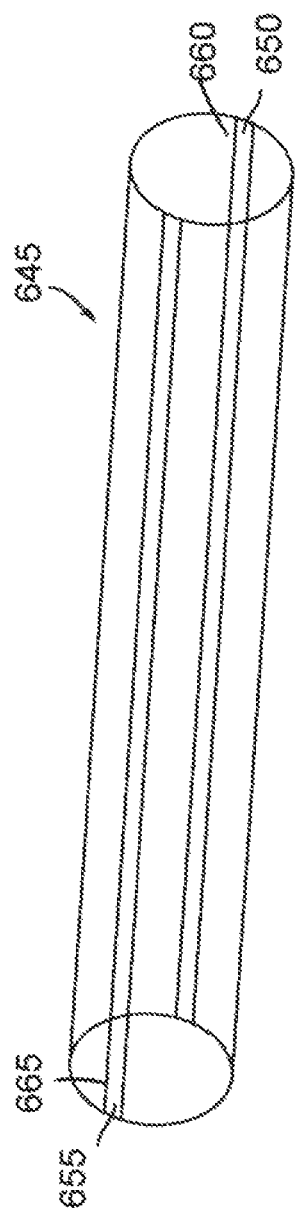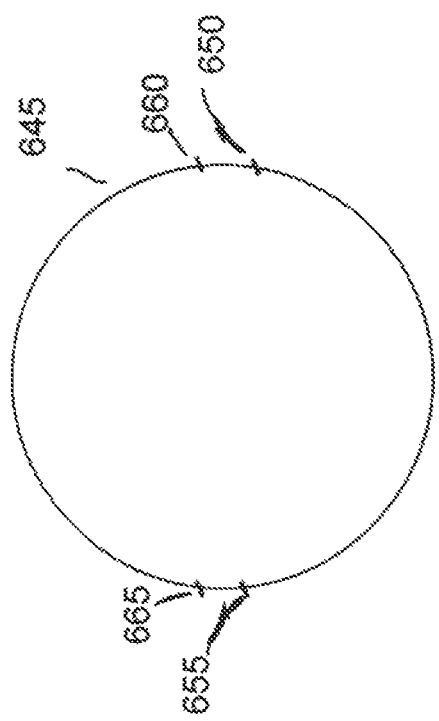

EASY OPEN LINERS FOR SOIL AND SEDIMENT SAMPLERS

RELATED APPLICATIONS

This application is a continuation-in-part of U.S. patent application Ser. No. 12/959,925, filed on Dec. 3, 2010 and titled EASY OPEN LINERS FOR SOIL SAMPLERS, the contents of which are herein incorporated by reference in its entirety.

FIELD OF THE INVENTION

The invention relates to a system and method for an easy-to-open liner for use in connection with soil and sediment samplers, including direct push technology, rotary and coring systems. The liner according to the invention is pre-scored along its length by one or more score lines formed in the exterior surface or the interior surface of the liner. After removal from the soil and sediment sampler, the liner of the invention can easily be opened to expose the contained sample without the need of cutting blades or other sharp objects, in accordance with health and safety requirements.

BACKGROUND OF THE INVENTION

Site investigations for environmental remediation operations require the extraction of soil, sediment and/or chemical samples for geologic characterization. Direct-push technology (DPT) systems are hydraulically powered machines that use static and/or dynamic percussion force to advance small-diameter sampling tools to retrieve soil and sediment samples. A well known DPT system is the Geoprobe® Large Bore (LB) Soil Sampler®.

DPT systems operate by attaching a sample tube to a probe rod and driving the sample tube into the subsurface using a direct-push probing machine. A removable liner is placed inside the sample tube prior to attachment to the probe rod. A sub-surface soil or sediment sample is collected in the sample tube, which is then withdrawn from the sub-surface to the surface and the liner containing the sample is removed from the sample tube. Liners may be made from a variety of materials, including clear polyvinylchloride (PVC), unplasticized polyvinylchloride (UPVC), Lexan® or other suitable plastic material.

To recover the sample, the liner must be opened. Cutting tools exist for opening liners. For example, Geoprobe® Systems of Salinas, Kans. sells liner cutters which create two parallel slits along the length of the filled liner. The liner must be secured by a liner holder, also sold by Geoprobe® Systems, or a vise, to use the liner cutter. Often, though, staff cut open the liners by pulling a blade down the surface of the liners towards themselves. This approach has been known to result in cutting injuries to the person and his/her gear.

U.S. Pat. No. 5,606,139 to Wittig, Kejr and Christy titled Soil Sample Probe With Retaining Ring for Holding Core-Catching Structure Within the Probe, the contents of which are herein incorporated by reference in their entirety, discloses a probe comprising a removably attached sample tube and a liner positioned in the sample tube for receiving a soil or sediment sample. After the sample tube has been filled with the soil or sediment sample, it is removed from the ground and the liner with the sample therein is removed from the sample tube. The soil or sediment sample can be removed from the liner by forcing the core out of the liner or by simply slitting the liner and peeling it from the core.

SUMMARY OF THE INVENTION

The invention relates to a system and method for an easy-to-open liner for use in connection with soil and sediment samplers, including direct push technology, rotary and coring systems. The liner according to the invention is pre-scored along its length by at least one score line formed in the exterior surface or the interior surface of the liner. The score line may comprise an indentation of substantially uniform depth along the length of the liner, or the score line may comprise a plurality of indentations and/or perforations placed along the length of the liner. After removal from the sampler, the liner of the invention can easily be opened without the need of cutting blades or other sharp objects to expose the contained sample, in accordance with health and safety requirements. In one embodiment, the liner comprises a single score line configuration. In one embodiment, the liner comprises a double score line configuration to form a "tear" strip. In this embodiment, the liner can be opened by removing the "tear" strip. In one embodiment, the liner comprises two or more double score line configurations to form two or more "tear" strips. In this embodiment, the liner can be opened by removing the "tear" strips. A cord, cable or wire can be incorporated in one or more of the "tear" strips to provide additional tensile strength which facilitates the removal of the "tear" strips. In one embodiment, the liner comprises a double score line configuration to form a "tear" strip and also a single score line substantially on the opposite side of the liner from the "tear" strip. When the "tear" strip is removed, the single score line acts as a hinge to open the liner for removal of the contained sample.

Also disclosed is a method of manufacturing a scored liner for a sample tube for use in soil and sediment sampling systems. The liner is formed by extrusion, where one or more cutting tools are positioned along with the die to form one or more score lines on the exterior surface or the interior surface of the liner. The score lines do not extend through the wall of the liner. In one embodiment, a cord, cable or wire is fed through the die at the front of the extruder barrel and molded into the liner as the molten plastic is forced through the die. The extrudate is cooled such that the cooled liner includes the score lines in the configuration and depth desired by the manufacturer.

In another embodiment, the liner can be a commercially available liner, and may comprise PVC, UPVC, a polycarbonate resin thermoplastic such as Lexan® or other suitable plastic material. The liner is scored with one or more score lines situated on the exterior surface or the interior surface of the liner. The score lines do not extend through the wall of the liner. The scoring and printing can be performed with laser scoring equipment such that the scored lines do not extend through the wall of the liner.

Further disclosed is a method of using a scored liner in a sample tube in soil and sediment sampling systems. A sampler is attached to a probe rod and driven into the subsurface using a direct-push probing machine. A liner according to the invention is placed inside a sample tube which is situated inside the sampler prior to attachment to the machine. A sub-surface soil and sediment sample is collected in the sample tube, which is then withdrawn from the sub-surface to the surface and the liner containing the sample is removed from the sample tube. The liner has been pre-scored with one or more score lines, which may comprise one or more "tear" strips. The liner may further comprise printed cues indicating the location of the score lines or the "tear" strips, and the direction to pull the "tear" strips. The score lines do not extend through the wall of the liner. The end of the "tear"

strips are gripped and pulled in a controlled tear to open the liner and reveal the enclosed sample, without the use of cutting blades.

DESCRIPTION OF THE DRAWINGS

The invention will be described with reference to the accompanying drawings, in which like elements are referenced with like numerals.

FIG. 3A depicts a left perspective view of an embodiment of the invention comprising a "tear" strip and a single score line configuration.

FIG. 3B depicts an end view of the embodiment shown in FIG. 3A.

FIG. 3C depicts the embodiment shown in FIG. 3A after opening.

FIG. 4A depicts a left perspective view of an embodiment of the invention comprising a "tear" strip with a cord, cable or wire incorporated therein.

FIG. 4B depicts an end view of the embodiment of FIG. 4A.

FIG. 5A depicts a left perspective view of an embodiment of the invention comprising a "tear" strip and a single score line configuration.

FIG. 5B depicts an end view of the embodiment shown in FIG. 5A.

FIG. 6A depicts a left perspective view of an embodiment of the invention comprising two "tear" strips.

FIG. 6B depicts an end view of the embodiment of FIG. 6A.

DETAILED DESCRIPTION OF THE INVENTION

Figure 1A:
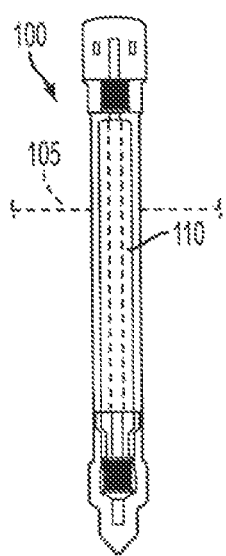
FIGS. 1A-1F depict a typical direct push technology system for sampling sub-surface soil or sediment.
Figure 1B:
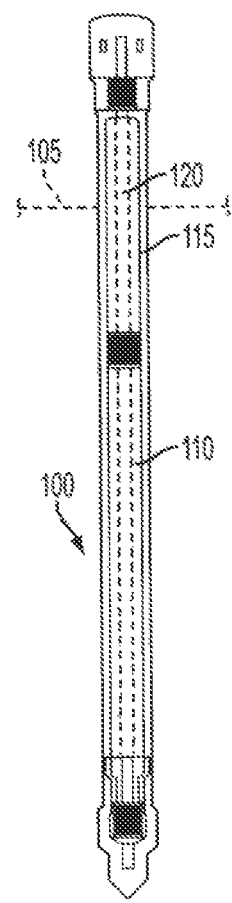
Figure 1C:
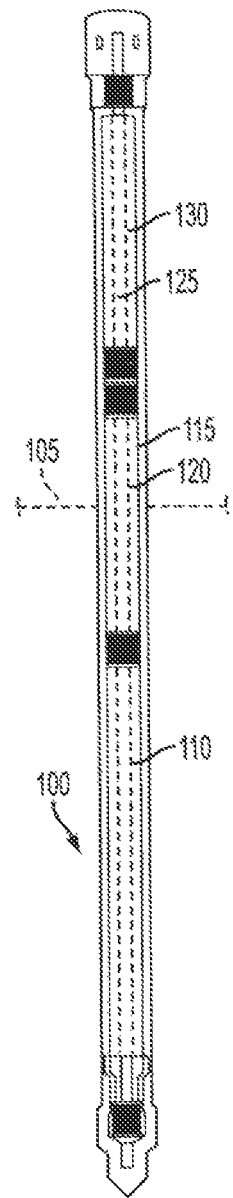
Figure 1D:
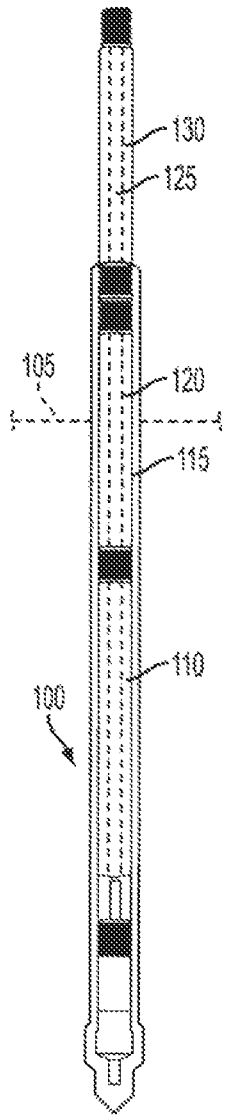
Figure 1E:
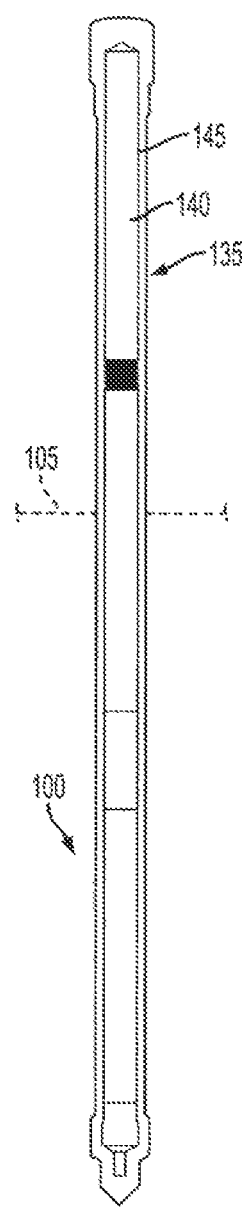
Figure 1F:
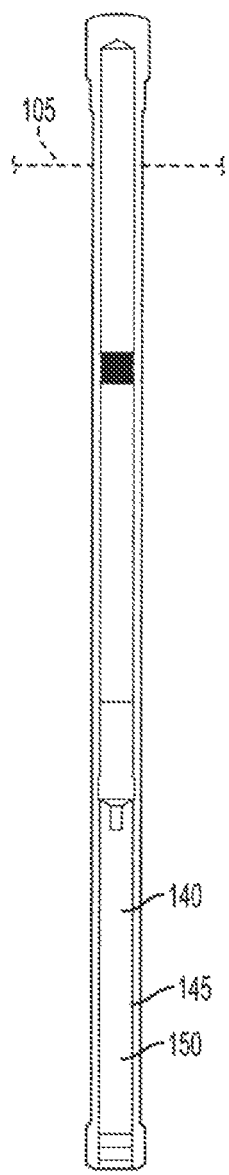

The invention relates to a system and method for an easy-to-open liner for use in connection with soil and sediment samplers, including direct push technology, rotary and coring systems. The liner according to the invention is pre-scored along its length by at least one score line formed in the exterior surface or the interior surface of the liner. Each score line may comprise an indentation of substantially uniform depth along the length of the liner, or the score line may comprise a plurality of indentations and/or perforations placed along the length of the liner. After removal from the sample tube, the liner of the invention can easily be opened without the need of cutting blades or other sharp objects to expose the contained sample, in accordance with health and safety requirements.

According to one embodiment of the invention, a liner for use in lining sample tubes in soil and sediment sampling systems comprises PVC, UPVC, a polycarbonate resin thermoplastic such as Lexan® or other suitable plastic material. The liner is scored with a first score line down the length of the liner. The first score line may comprise an indentation of substantially uniform depth or a plurality of perforations or indentations. The indentation(s) comprising the score line do not extend through the wall of the liner, and may be situated either on the interior or the exterior surface of the liner. The liner may further comprise printed cues indicating the location of the first score line and the direction to tear open the liner along the first score line. Upon opening, the liner separates in a controlled tear, without the use of cutting blades, to reveal the enclosed sample.

The liner of this embodiment may further comprise a second score line. The second score line may be located substantially on the opposite side of the liner from the first score line, or it may be located anywhere desired by the manufacturer of the liner. The second score line may comprise an indentation of substantially uniform depth or a plurality of perforations or indentations. The liner may comprise a flexible material of construction such that the second score line operates in the nature of a hinge so that once the liner is opened along the first score line, it can be unfolded at the second score line to more fully expose the enclosed sample.

According to another embodiment of the invention, a liner for use in lining sample tubes in soil and sediment sampling systems comprises PVC, UPVC, a polycarbonate resin thermoplastic such as Lexan® or other suitable plastic material. The liner is scored with a first score line substantially parallel to a second score line which are situated down the length of the liner. Each of the first and second score lines may comprise an indentation of substantially uniform depth or a plurality of perforations or indentations situated approximately 3 mm to 15 mm apart, which together form a "tear" strip. The indentation(s) comprising the first and second score lines do not extend through the wall of the liner, and may be situated either on the interior or the exterior surface of the liner. The liner may further comprise printed cues indicating the location of the "tear" strip and the direction to pull the "tear" strip. Upon pulling, the "tear" strip separates from the liner in a controlled tear, without the use of cutting blades, to open the liner and reveal the enclosed sample.

One end or both ends of the "tear" strip may further comprise a "tab" that can be gripped and pulled by use of a tool designed to engage the "tab" of the "tear" strip. In one embodiment, the tool comprises a "key" which comprises a lengthwise slot into which the "tab" portion of the "tear" strip is inserted. With the "tab" portion of the "tear" strip inserted through the slot, the "key" is rotated along the length of the "tear" strip to wind them around the "key," thus tearing the "tear" strip away from the liner.

The "tear" strip of this embodiment may further comprise a cord, cable or wire that provides additional tensile strength and facilitates the removal of the "tear" strip from the liner.

The liner of this embodiment may further comprise a third score line. The third score line may be located substantially on the opposite side of the liner from the "tear" strip. The third score line may comprise an indentation of substantially uniform depth or a plurality of perforations or indentations which do not extend through the wall of the liner. The liner may comprise a flexible material of construction such that the third score line operates in the nature of a hinge so that once the liner is opened along the "tear" strip, it can be unfolded at the third score line to more fully expose the enclosed sample. In one embodiment, the "tear" strip is located at approximately 2 o'clock and the third score line is located at approximately 10 o'clock when viewed from the end of liner (approximately 120° apart).

Alternatively, the liner of this embodiment may comprise a first and a second "tear" strip, wherein each "tear" strip comprises a first score line substantially parallel to a second score line. Each of the first and second score lines may comprise an indentation of substantially uniform depth or a plurality of perforations or indentations situated approximately 3 mm to 15 mm apart, which together form the "tear" strips. The indentation(s) comprising the first and second score lines do not extend through the wall of the liner, and may be situated either on the interior surface or the exterior surface of the liner. The liner may further comprise printed cues indicating the location of the "tear" strips and the direction to pull the "tear" strips. Upon pulling, the "tear" strip separate from the liner in a controlled tear, without the use of cutting blades, to open the liner and reveal the enclosed sample.

Each of the "tear" strips may further comprise a cord, cable or wire that provides additional tensile strength and facilitates the removal of each "tear" strip from the liner.

One end or both ends of the "tear" strips may further comprise a "tab" that can be gripped and pulled by use of a tool designed to engage the "tabs" of the "tear" strips. In one embodiment, the tool comprises a "key" which comprises a lengthwise slot into which the "tab" portions of the "tear" strips is inserted. With the "tabs" portion of the "tear" strips inserted through the slot, the "key" is rotated along the length of the "tear" strips to wind them around the "key," thus tearing the "tear" strips away from the liner.

The first "tear" strip and the second "tear" strip may be configured substantially opposite to each other on the liner, or may be situated in any configuration desired by the manufacturer. In one embodiment, the "tear" strips are located approximately 120° apart.

According to another embodiment of the invention, the wall thickness of the liner comprises about 1.2 mm. The depth of the indentations or perforations in the score lines may comprise about 0.8 mm. The diameter of the liner may be sized to fit any sample tube sizes used in site investigation ranging from 26 mm to 300 mm, including but not limited to 52.5 mm; 87 mm; 97 mm; and 124 mm.

Also disclosed is a method of manufacturing a scored liner for use in a lining sample tube in soil and sediment sampling systems. Raw material in the form of small beads, or resin, is fed into the barrel of an extruder via a hopper. Additives such as colorants and UV inhibitors can be mixed into the raw material prior to loading into the hopper. The raw material, along with additives if desired, is fed into the barrel of the extruder at the back end where it contacts a rotating extruder screw. The screw forces the raw material forward through the barrel which is heated to the desired melt temperature of the molten raw material. There may be heater zones to set up a heating profile for the extruder barrel to gradually increase the temperature of the barrel from the back end where the raw material enters the extruder barrel to the front end of the extruder barrel. Extra heat is caused by the pressure and friction inside the barrel. Cooling fans and/or heat exchangers may be present to reduce the temperature if too much heat is generated.

After passing through the extruder barrel, the molten raw material enters a die at the front of the extruder barrel, which gives the final product its profile shape. One or more cutting tools are positioned along with the die to form score lines on the exterior surface or the interior surface of the extruded liner. A cord, cable or wire can be fed through the die at the front of the extruder barrel and molded into a "tear" strip in the liner as the molten plastic is forced through the die. The product is then cooled, for example by pulling the extrudate through a water bath which may be under vacuum to keep the molten liner from collapsing. The cooled liner comprises one or more score lines in the configuration and depth desired by the manufacturer.

In another embodiment, the liner can be a commercially available liner, and may comprise PVC, UPVC, a polycarbonate resin thermoplastic such as Lexan® or other suitable plastic material. The liner is scored with one or more score lines situated on the exterior surface or the interior surface of the liner. The score lines do not extend through the wall of the liner. The scoring and printing can be performed with laser scoring equipment such that the scored lines do not extend through the wall of the liner.

Further disclosed is a method of using a scored liner in a sample tube in soil and sediment sampling systems. A sampler is attached to a probe rod and driven into the subsurface using a direct-push probing machine. A liner according to the invention is placed inside a sample tube which is situated inside the sampler prior to attachment to the probe rod. A sub-surface soil and sediment sample is collected in the sample tube, which is then withdrawn from the sub-surface to the surface and the liner containing the sample is removed from the sample tube. The liner is scored with one or more score lines, or a plurality of score lines situated substantially parallel to form one or more "tear" strips, in the exterior surface or the interior surface of the liner. The liner may further comprise printed cues indicating the locations of the score lines or the "tear" strips, and the direction to pull the "tear" strips. One end or both ends of the "tear" strips may further comprise a "tab" that can be gripped and pulled by use of a tool designed to engage the "tab" of the "tear" strips. The score lines do not extend through the wall of the liner. The ends of the "tear" strips are gripped and pulled in a controlled tear to open the liner without the use of cutting blades, and reveal the enclosed sample.

If the liner comprises two "tear" strips, both "tear" strips may be opened to fully open up the lining to reveal the sample. If the liner comprises a score line either in addition to a first single score line or a single "tear" strip, the liner may be unfolded using the score line as a hinge.

FIGS. 1A-1F depict a typical direct push technology system for sampling sub-surface soil or sediment. At FIG. 1A, a sampler 100 having center rod 110 is driven into the ground 105 to a first position. At FIG. 1B, a probe 115 and center rod 120 are added to sampler 100 and sampler 100 is advanced further into ground 105 to a second position. At FIG. 1C, an additional probe 125 and center rod 130 are added to sampler 100 and sampler 100 is advanced further into ground 105 to the desired sampling position. Center rods 110, 120 and 130 are connected. At FIG. 1D, center rods 110, 120 and 130 are removed. At FIG. 1E, probe rod 135 comprising sample tube 140 is inserted into sampler 100. Sample tube 140 is lined with removable liner 145. At FIG. 1F, sample tube 140 is advanced further into ground 105 and sample 150 is collected in liner 145. Sample tube 140 is removed with sample 150 inside liner 145.

Figure 2A:
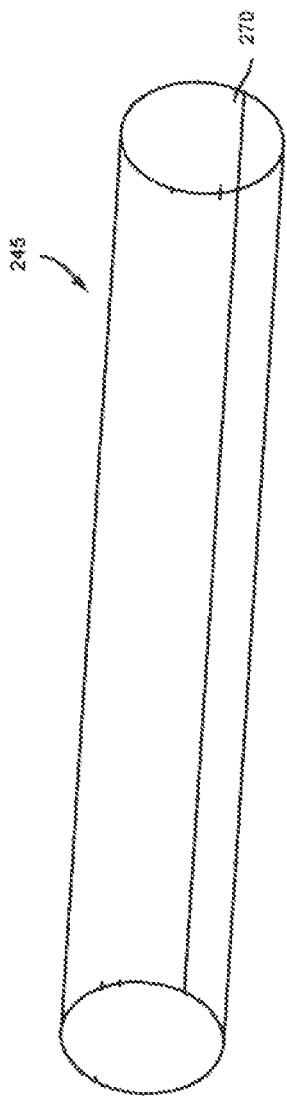
FIG. 2A depicts a left perspective view of an embodiment of the invention comprising a single score line configuration.

FIG. 2A depicts a left perspective view of an embodiment of the invention comprising a single score line configuration. Liner 245 comprises single score line 270.

Figure 2B:
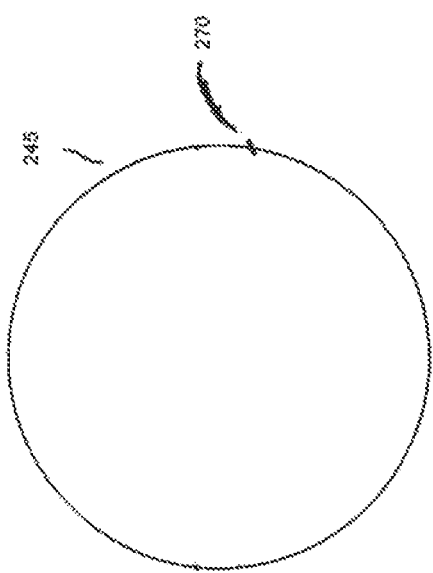
FIG. 2B depicts an end view of the embodiment shown in FIG. 2A.

FIG. 2B depicts an end view of liner 245 of FIG. 2A.

Figure 2C:
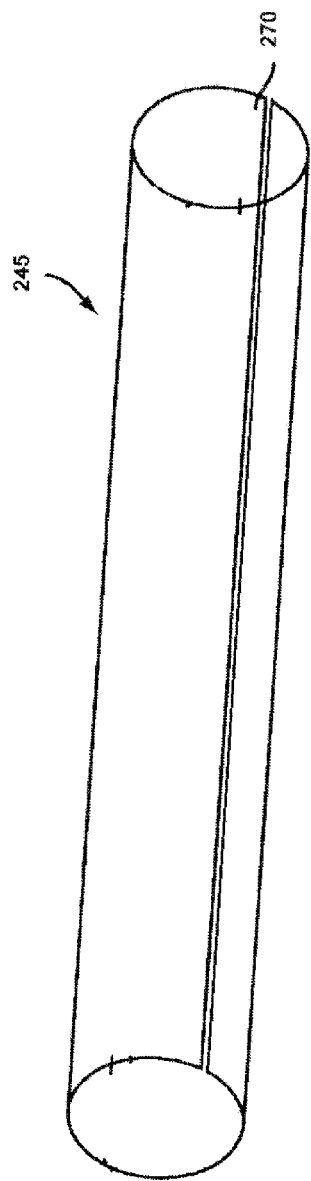
FIG. 2C depicts the embodiment shown in FIG. 2A after having been opened.

FIG. 2C depicts liner 245 after having been opened by cutting along score line 270.

FIG. 3A depicts a left perspective view of an embodiment of the invention comprising a "tear" strip. Liner 345 comprises score lines 360 and 365. Score lines 360 and 365 are located approximately 3 mm to 15 mm apart and together comprise a "tear" strip.

FIG. 3B depicts an end view of the liner 345 of FIG. 3A.

FIG. 3C depicts liner 345 of FIG. 3A after "tear" strip comprising score lines 360 and 365 has been removed, and liner 345 has been opened.

FIG. 4A depicts a left perspective view of liner 345 where "tear" strip comprising score lines 360 and 365 further comprises cord, cable or wire 450 incorporated therein.

FIG. 4B depicts an end view of the embodiment of FIG. 4A.

Figure 4C:
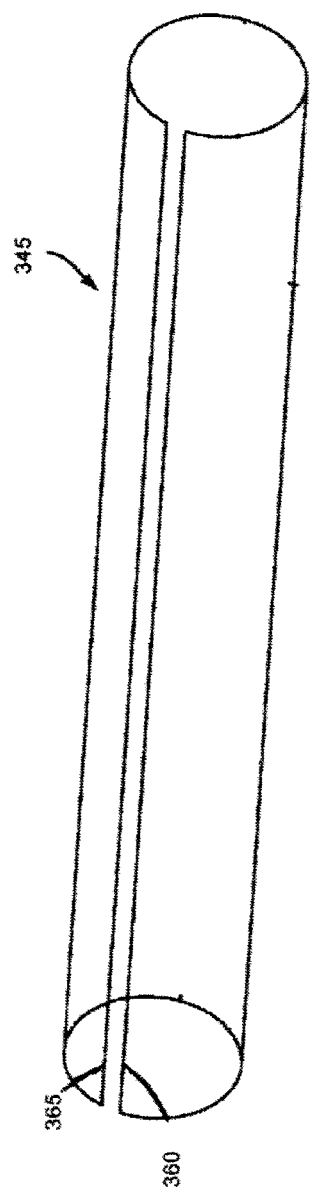
FIG. 4C depicts the embodiment shown in FIG. 4A after opening.

FIG. 4C depicts liner 345 of FIG. 4A after "tear" strip comprising score lines 360 and 365 has been removed, and liner 345 has been opened using score line 370 as a hinge.

FIG. 5A depicts a left perspective view of an embodiment of the invention comprising a "tear" strip and a single score line configuration. Liner 545 comprises score lines 560 and 565 and single score line configuration 570. Score lines 560 and 565 are located approximately 3 mm to 15 mm apart and together comprise a "tear" strip.

FIG. 5B depicts an end view of the liner 545 of FIG. 5A. "Tear" strip comprising score lines 560 and 565 is located approximately at the 2 o'clock position and single score line 570 is located approximately at the 10 o'clock position when viewed from either end of liner 545.

Figure 5C:
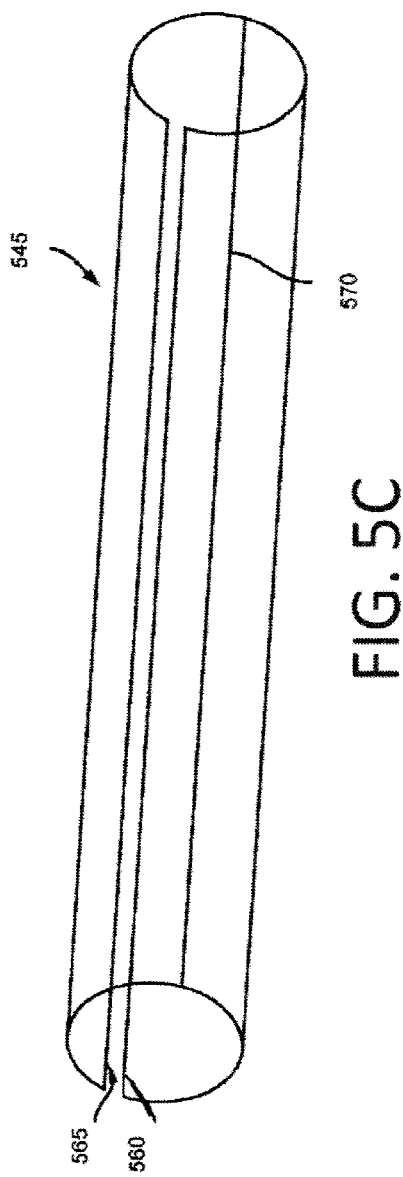
FIG. 5C depicts the embodiment shown in FIG. 5A after opening.

FIG. 5C depicts liner 545 of FIG. 5A after "tear" strip comprising score lines 560 and 565 has been removed, and liner 545 has been opened using score line 570 as a hinge.

FIG. 6A depicts a left perspective view of an embodiment of the invention comprising two "tear" strips. Liner 645 comprises score lines 650 and 660 are located approximately 3 mm to 15 mm apart and together comprise a first "tear" strip, and score lines 655 and 665 are located approximately 3 mm to 15 mm apart and together comprise a second "tear" strip.

FIG. 6B depicts an end view of the embodiment of FIG. 6A. First and second "tear" strips comprising score lines 650 and 660 and score lines 655 and 665, respectively, are located approximately on opposite sides of liner 645.

Figure 6C:
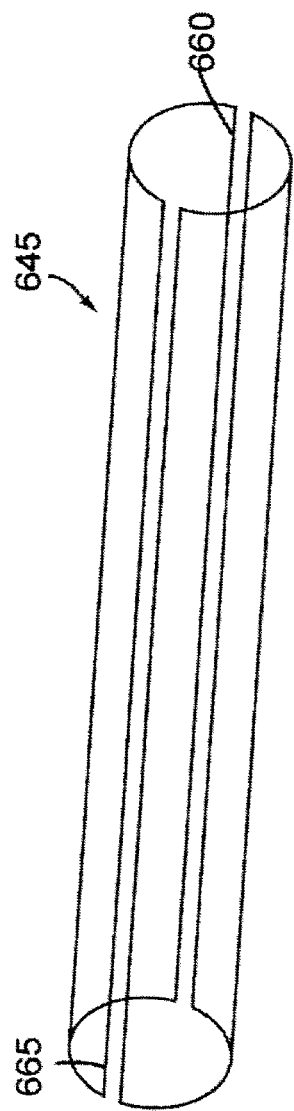
FIG. 6C depicts the embodiment shown in FIG. 6A after opening.

FIG. 6C depicts liner 645 of FIG. 6A after first and second "tear" strips comprising score lines 650 and 660 and score lines 655 and 665, respectively, have been removed.

Figure 7A:
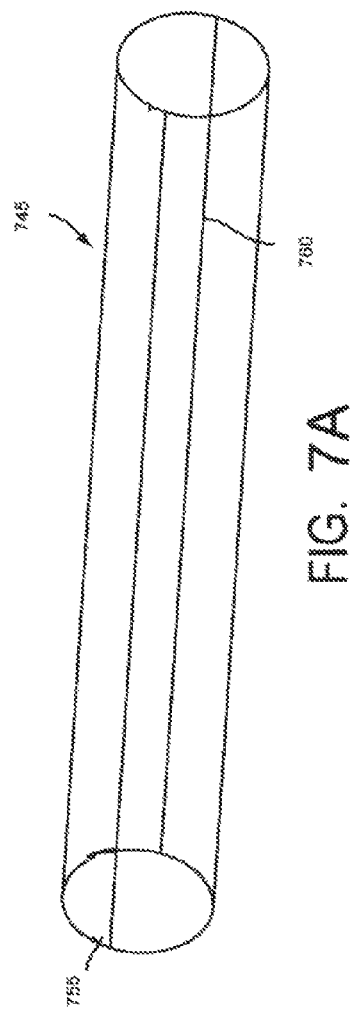
FIG. 7A depicts a left perspective view of an embodiment of the invention comprising a plurality of single score lines.

FIG. 7A depicts a left perspective view of an embodiment of the invention comprising a plurality of single score lines. In this embodiment, liner 745 comprises two single score lines 755 and 760. Liner 745 may be cut open using cutting blades along either or both of single score lines 755 and 760. Although this embodiment requires the use of cutting blades, the presence of score lines 755 and 760 greatly reduces the force that must be used to open liner 745.

Figure 7B:
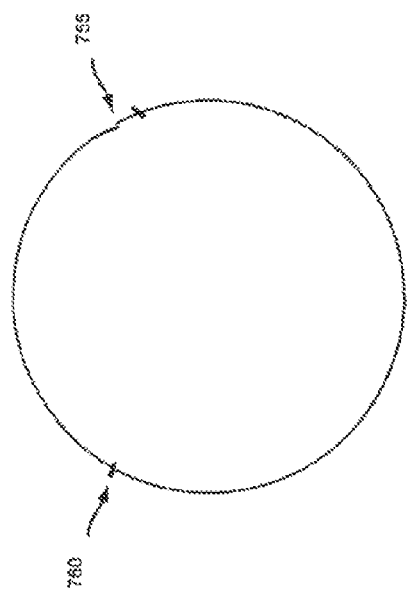
FIG. 7B depicts an end view of the embodiment of FIG. 7A.

FIG. 7B depicts an end view of liner 745 of FIG. 7A.

Figure 8A:
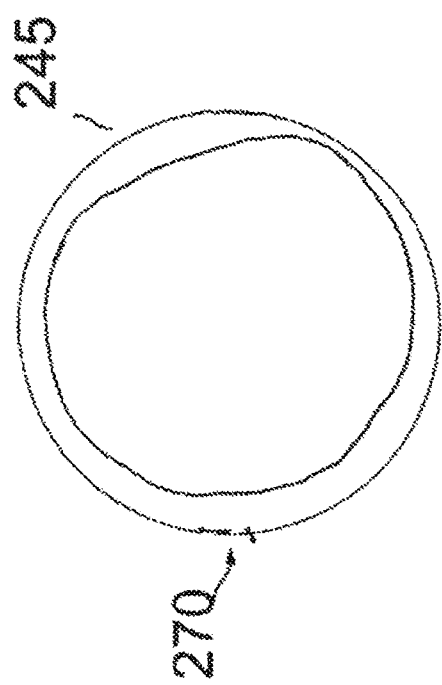
FIG. 8A depicts one embodiment of the invention comprising a score line situated on the exterior surface of the liner.

FIG. 8A depicts liner 245 comprising exterior surface 230 and interior surface 240, where score line 270 is situated on exterior surface 230 of liner 245.

Figure 8B:
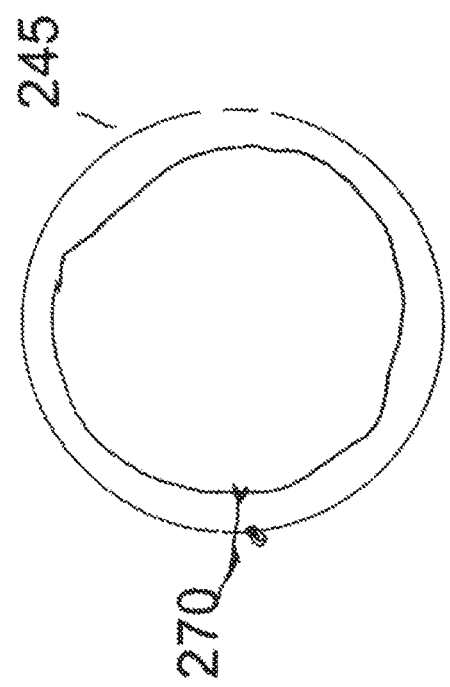
FIG. 8B depicts one embodiment of the invention comprising a score line situated on the interior surface of the liner.

FIG. 8B depicts liner 245 comprising exterior surface 230 and interior surface 240, where score line 270 is situated on interior surface 240 of liner 245.

The foregoing embodiments have been presented for the purpose of illustration and description only and are not to be construed as limiting the scope of the invention in any way.

What is claimed is:

1. A liner for a soil and sediment sampler system comprising:

an annular tube comprising a length, an outer surface and an inner surface, wherein the thickness of the annular tube is defined by the distance between the outer surface and the inner surface;

at least two substantially parallel score lines each comprising a score line configuration on the inner surface, wherein the depth of each score line comprising the score line configuration is less than the thickness of the annular tube, where each score line comprises an indentation of substantially uniform depth or a series of perforations into the thickness of the annular tube; and a first tear strip, wherein the first tear strip comprises two substantially parallel score lines, wherein the first tear strip further comprises a cord, cable or wire embedded between the inner surface and the outer surface, wherein at least one end of the first tear strip further comprises a tab configured for gripping to facilitate removal of the first tear strip from the liner, wherein the liner is configured for insertion into a sample tube of a direct push technology system for sampling sub-surface soil or sediment, wherein further the interior of the annular tube is configured to contain a soil or sediment sample.

2. The liner for a soil and sediment sampler system of claim 1, wherein the two score lines of the first tear strip are located at a distance of approximately 3 mm to 15 mm apart.

3. The liner for a soil and sediment sampler system of claim 2, wherein the two score lines of the first tear strip are located at a distance of approximately 10 mm apart.

4. The liner for a soil and sediment sampler system of claim 1, further comprising a second tear strip.

5. The liner for a soil and sediment sampler system of claim 4, wherein at least one of the first tear strip and the second tear strip further comprises a cord, cable or wire embedded between the inner surface and the outer surface, wherein at least one end of one or both of the first tear strip and the second tear strip further comprises a tab configured for gripping to facilitate removal of the first tear strip or the second tear strip from the liner.

6. The liner for a soil and sediment sampler system of claim 5, wherein the two score lines of the second tear strip are located at a distance of approximately 3 mm to 15 mm apart.

7. The liner for a soil and sediment sampler system of claim 6, wherein the two score lines of the second tear strip are located at a distance of approximately 10 mm apart.

8. The liner for a soil and sediment sampler system of claim 7, wherein the first tear strip and the second tear strip are configured approximately on opposing sides of the annular tube.

9. The liner for a soil and sediment sampler system of claim 1, wherein the annular tube comprises polyvinylchloride, unplasticized polyvinylchloride or polycarbonate resin thermoplastic.

10. The liner for a soil and sediment sampler system of claim 1, further comprising a third score line.

11. The liner for a soil and sediment sampler system of claim 10, wherein the first tear strip and the third score line are configured approximately 120° apart on the annular tube.

12. The liner for a soil and sediment sampler system of claim 9, wherein the thickness of the annular tube is approximately 1.2 mm.

13. The liner for a soil and sediment sampler system of claim 12, wherein the depth of the score lines is approximately 0.8 mm.

14. A method of opening a liner for a soil and sediment sampler system comprising:
- inserting a liner into a sample tube into a sampler of a direct push soil and sediment sampling system;
- driving the sampler into the sub-surface of the ground;
- collecting a soil or sediment sample in the interior of the liner;
- withdrawing the sampler from the sub-surface;
- removing the liner containing the soil or sediment sample from the sample tube; and
- opening the liner, wherein the liner comprises an annular tube comprising a length, an outer surface and an inner surface, wherein the thickness of the annular tube is defined by the distance between the outer surface and the inner surface;

at least one score line on the inner surface, wherein the score line comprises an indentation of substantially uniform depth or a series of perforations into the thickness of the annular tube into the thickness of the annular tube, wherein the depth of the score line is less than the thickness of the annular tube; and a first tear strip and a second tear strip, wherein each of the first tear strip and the second tear strip comprises two substantially parallel score lines at a distance of approximately 10 mm apart, wherein at least one of the first tear strip and the second tear strip further comprises a cord, cable or wire embedded between the inner surface and the outer surface, wherein at least one end of one or both of the first tear strip and the second tear strip further comprises a tab configured for gripping to facilitate removal of the first tear strip or the second tear strip from the liner, and wherein the first tear strip and the second tear strip are configured approximately on opposing sides of the annular tube, wherein opening the liner comprises opening the liner along at least one of the score lines.

15. The method of claim 14, wherein the liner comprises a first tear strip and a third score line, wherein the first tear strip and the third score line are configured approximately 120° apart on the annular tube.

* * * * *